(12) United States Patent
Gaudfrin (10) Patent No.: US 8,628,661 B2
(45) Date of Patent: Jan. 14, 2014

(54) DISC FILTRATION DEVICE

(75) Inventor: Guy Gaudfrin, Saint Nom la Bretèche (FR)

(73) Assignee: Guadfrin, St. German en Laye (FR)

( * ) Notice: Subject to any disclaimer, the term of this patent is extended or adjusted under 35 U.S.C. 154(b) by 361 days.

(21) Appl. No.: 12/679,410

(22) PCT Filed: Sep. 26, 2007

(86) PCT No.: PCT/FR2007/001575
§ 371 (c)(1),
(2), (4) Date: Jul. 19, 2010

(87) PCT Pub. No.: WO2009/040482
PCT Pub. Date: Apr. 2, 2009

(65) Prior Publication Data
US 2010/0282659 A1 Nov. 11, 2010

(51) Int. Cl.
*B01D 35/30* (2006.01)
*B01D 29/00* (2006.01)
*B01D 33/00* (2006.01)
*B01D 35/12* (2006.01)
*B01D 35/16* (2006.01)
*B01D 24/00* (2006.01)
*B01D 25/00* (2006.01)
*B01D 27/00* (2006.01)
*B01D 35/22* (2006.01)
*B01D 39/00* (2006.01)

(52) U.S. Cl.
USPC ........... 210/232; 210/236; 210/331; 210/346; 210/486

(58) Field of Classification Search
USPC ................. 210/232, 236, 331, 346, 348, 486; 29/896.62
See application file for complete search history.

(56) References Cited

U.S. PATENT DOCUMENTS

| | | | | |
|---|---|---|---|---|
| 2,696,916 A | * | 12/1954 | Peterson et al. | 210/236 |
| 3,298,524 A | | 1/1967 | Gaudfrin | |
| 3,485,376 A | * | 12/1969 | Peterson et al. | 210/331 |
| 3,540,597 A | | 11/1970 | Gaudfrin | |
| 3,643,803 A | * | 2/1972 | Glos, II | 210/232 |
| 3,682,306 A | | 8/1972 | Gaudfrin | |
| 3,692,181 A | | 9/1972 | Davis | |
| 4,569,762 A | | 2/1986 | Gaudfrin | |

(Continued)

FOREIGN PATENT DOCUMENTS

| | | |
|---|---|---|
| DE | 22 51 021 | 5/1974 |
| FR | 2 595 957 | 9/1987 |
| FR | 2 779 973 | 12/1999 |

*Primary Examiner* — Nam Nguyen
*Assistant Examiner* — Clare Perrin
(74) *Attorney, Agent, or Firm* — Harness, Dickey & Pierce, P.L.C.

(57) ABSTRACT

The disclosure relates to a filtration device that comprises a disc with a rim covering and stiffening a plurality of filtration sectors connected to taps provided on the outer wall of a rotary main shaft containing inner discharge channels and fit-inserted into said taps and into a crown comprising two parts concentric to the shaft, one which is secured to the shaft while the other is removable, characterised in that said rim is provided with openings each intended for receiving a removable connection flange bearing, on the one hand, a radial strut clamped between two adjacent sectors for the relative clamping thereof and interacting, on the other hand, with a spring quick fastener for locking the strut under tension between the sectors. The disclosure also relates to a method for assembling and maintaining said filtration device.

16 Claims, 6 Drawing Sheets

(56) References Cited

U.S. PATENT DOCUMENTS

| | | | |
|---|---|---|---|
| 4,578,192 A * | 3/1986 | Muller | 210/486 |
| 4,648,970 A * | 3/1987 | Hermansson | 210/327 |
| 4,659,469 A | 4/1987 | Gaudfrin | |
| 4,789,474 A | 12/1988 | Gaudfrin | |
| 4,935,138 A | 6/1990 | Gaudfrin | |
| 5,893,972 A * | 4/1999 | Peterson | 210/331 |
| 7,314,556 B2 | 1/2008 | Sheets et al. | |
| 2002/0153296 A1 * | 10/2002 | Servo et al. | 210/232 |
| 2008/0164201 A1 | 7/2008 | Gaudfrin | |

* cited by examiner

DISC FILTRATION DEVICE

CROSS-REFERENCE TO RELATED APPLICATIONS

This application is a National Phase Entry of International Application No. PCT/FR2007/001575, filed on Sep. 26, 2007, which is incorporated by reference herein.

BACKGROUND AND SUMMARY

The present invention relates to a disc filtration device and the assembling and maintenance methods therefor.

Among the devices used for the liquid/solid separation of a loaded suspension on an industrial scale, large diameter discs more particularly exist which are provided with a rim capping and rigidifying a plurality of filtering sectors by surrounding them. Such sectors are generally covered with a cloth and provided with pipes which are likely to be connected to the external wall of a rotating central shaft by opening into internal outlet channels for the filtered liquid. Such discs are vertically positioned and rotated, with their lower parts being immerged in tanks containing the suspensions to be filtered, whereas the internal channels of the shaft are successively depressed and pressurized to detach the solid fraction, also called cake.

The sectors are fixed to the shaft by various means among which the one consisting in engaging the outlet pipes thereof provided with a tip into the holes of a ring integral with the shaft, and in engaging the tips thereof into the offtakes of the external part of said shaft which open into said internal channels. A rubber sleeve generally provides the sealing of the connection between the pipes and the offtakes. A notch in the holes of the ring makes it possible to pass a pin integral with the sector pipe which, after a quarter turn, is caught by said ring and holds the sector in correct position.

Such devices are more particularly described in document FR 2 779 973. But the construction of such devices raises the problem of positioning tolerance of the pin of the pipe in the sectors which are consequently exposed to a risk of mechanical deformation. This risk is all the higher since the rotation thereof during the quarter turn required for the positioning thereof is forced. The problem of holding curvilinear elements composing the rim during the assembling thereof, which consequently becomes difficult and is exposed to risks of dismounting before all the elements are connected together, also arises.

Another drawback lies in the utilisation of threaded screws in the rim to wedge the sectors therebetween. Such screws do not make it possible to master the stresses caused on the sectors as well as on the rim nor to distribute the same appropriately over the whole disc. Now, such stresses cause deformations or even breaks in the sectors as well as in the rim. Such drawback is all the more tangible when it concerns the construction of very large discs which must, however, have a light structure required for the manual assembling of the sectors. In addition, such prior devices do not allow an easy maintenance because the replacement of only one or several used or damaged filtering sectors requires the dismounting of the rim to extract the pipe of the sector from the embedding thereof in the shaft.

The present invention aims at solving the technical problems raised by the devices of the prior art by offering simple, quick and rational methods for assembling and dismounting the sectors. This goal is reached, according to the invention, by using a filtration device, characterised in that said rim is provided with holes intended to receive each a detachable connection flange bearing, on the one hand, a radial spacer positioned between two adjacent sectors to provide the respective wedging thereof and, on the other hand, cooperating with a quick spring coupling to lock the loaded spacer between the sectors. According to an advantageous characteristic, the filtering sectors are accommodated in triangular pockets made of a filtering cloth, the external edges of which are folded on either side of the sector and fixed using cloth clips. According to another advantageous characteristic, said cloth clips include side flanks forming jaws and at the longitudinal ends thereof elastic lugs bordering said sectors.

Such lugs cover the folds formed at the angle of the pocket for which a sufficient space has been provided by slightly cutting the angles of the sector. The pockets covering the sectors are then slightly closed on the external edge thereof by the spring effect cloth clips which provide a simple, efficient and secure closing without having to use seaming or any other cumbersome method. According to a particular embodiment, said sectors include a structure mounted inside a frame and supporting the filtering cloth. Preferably, the jaws of the cloth clips rest on the structure only and do not extend up to the frame.

According to another embodiment, said rim is composed of a U-shaped section, the branches of which are oriented outwards and the width of which is much greater than the thickness of the sectors. The branches of the U are turned outwards and not towards the inside of the disc so as not to be an obstacle when discharging of the cake. The width of the rim makes it possible to increase the rigidity of the disc on the one hand, and to cause the stirring of the suspension on the other hand. Advantageously, said rim is formed by the assembling of several curvilinear section elements placed end to end and preferably of eight section elements.

According to still another advantageous characteristic, the device includes a ring composed of a fixed part integral with said shaft and a detachable part which, after being assembled, define, at a distance from said offtakes, brackets intended to support the ends of the sectors. Preferably, the detachable part of the ring is divided into several independent elements each including a clamp which provides the final locking of the sectors after the assembling. According to another characteristic, the connection flange has dimensions enabling same to slide into the orifice of said rim to cap the external edge of two adjacent sectors so as to adjust same and connect same to the rim.

A quick coupling is provided made of two hairpin-like rods resting on the spacer of the flange and the looped end of which is engaged into a slot of the rim, whereas the free ends thereof carrying hooks are introduced into and locked in openings provided in said rim. The quick coupling thus forms a spring engaged in various orifices provided in the rim on either side of the housing of the connection clamp, on which such spring applies a measured pressure upon the locking operation. The simultaneous action of the elastic lugs, the cloth clips and the V-shaped spacer of the connection flange and the spring effect quick-coupling, limits the overstress which might damage the sectors and deform the rim.

Another object of the invention is a method for assembling and maintaining a filtration device of the above-described type. The method of the invention provides that the supporting ring is made of two parts, one of which is integral with the shaft and the other is detachable, that a series of spokes providing the support for the rim are mounted on the offtakes of the shaft and on the fixed part of the ring, that the rim is fixed on the ends of adjacent spokes inside the rim and that said spokes are successively replaced by the sectors up to the completed filling of the disc. The assembling of the rim on the spokes is provisional and makes it possible to provide stability to the disc prior to and during the assembling of the sectors. In addition, it is provided to fix the rim on the spokes by simultaneously assembling curvilinear elements positioned end to end.

According to an alternative implementation, a peripheral holding ring is first fixed on said pipes, which is intended to cooperate with notches provided on said fixed or detachable parts of the supporting ring. The holding ring slides into the ring and supports, for the whole rotation of the disc, the weight of the sector which is thus not reported onto the rim.

According to a characteristic of the method, the sectors are installed by bringing them parallel to the disc plane, with the tips thereof being introduced into the offtakes with a slight inclination with respect to said plane, while folding the same in the rim and engaging the pipes into the ring, the sectors are locked on the rim through connection flanges and quick couplings, then the detachable part is assembled to the fixed part of the ring. The sectors are then held by the rim using connection clamps applied and locked with quick spring couplings. Finally, the elements of the detachable part of the ring are connected to the part integral with the shaft by clamps providing the final locking of the whole disc and thus preventing the coning thereof.

According to another alternative embodiment specific to the maintenance, the detachable part of the ring is disengaged, the connection flanges corresponding to the sectors to be replaced are released, then the sectors are removed one after the other by slightly inclining the same and taking the tips out of the offtakes, while installing simultaneously and at the same time new sectors so that the rim (2) remains permanently supported. The device of the invention allows an easy maintenance of the filtration facility by enabling the replacement of a sector independently of the others and this without any quarter turn or dismounting of the rim.

In addition, the method of the invention thus eliminates the risks of falls for the rim elements or deformation of the sectors upon the steps of filling of the disc by providing a stable mechanical behaviour of the latter prior to the mounting of said sectors and by enabling the positioning thereof without requiring the quarter turn to lock it in the ring. Thus, mounting operations can be carried out by only one operator. The rim is thus mounted once and for all. Thanks to the new fixation and locking mode of the sectors which releases the rim not only from the weight of the sectors and the filtration cakes thereof, but also from any accidental mounting mechanical constraints, thanks more particularly to a quick spring coupling, the rim thus transfers to the disc a greater rigidity and a better behaviour which are all the more required as the disc has large dimensions.

BRIEF DESCRIPTION OF DRAWINGS

The invention will be better understood when reading the following description and referring to the appended drawings wherein.

DETAILED DESCRIPTION

Figures 1, 2:
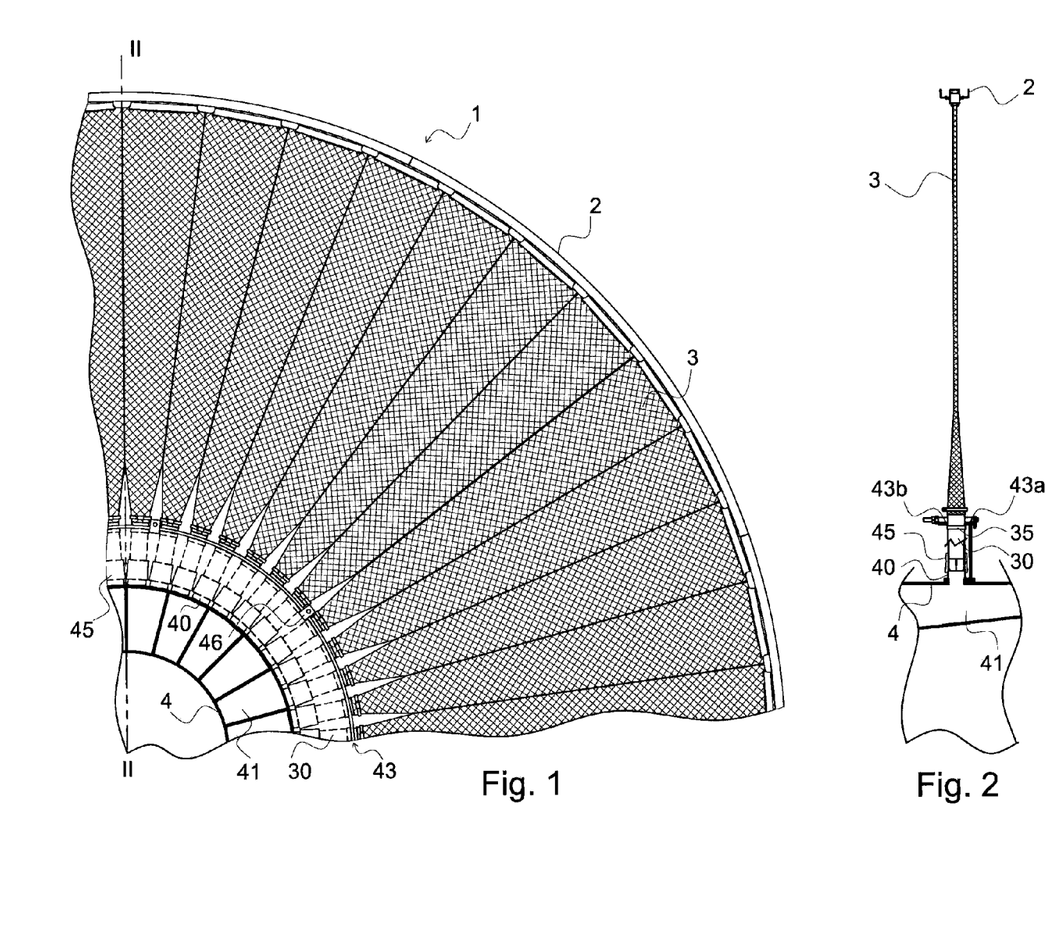
FIG. 1 shows a front view of an embodiment of the filtration device of the invention with the filtering disc and the supporting central shaft in cross-section.
FIG. 2 shows a cross-sectional view along II-II of the device of FIG. 1.

The filter device shown in FIGS. 1 and 2 includes a disc 1 provided with a rim 2 holding a plurality of filtering sectors 3. The sectors 3 are each composed of a triangular frame 31 made of a U-shaped section inserting a structure 32 in charge of draining the filtrates towards the outlet 30 provided with a tip 33, as shown more particularly in FIGS. 4A to 4C, 7A and 7B.

Figures 7A, 7B:
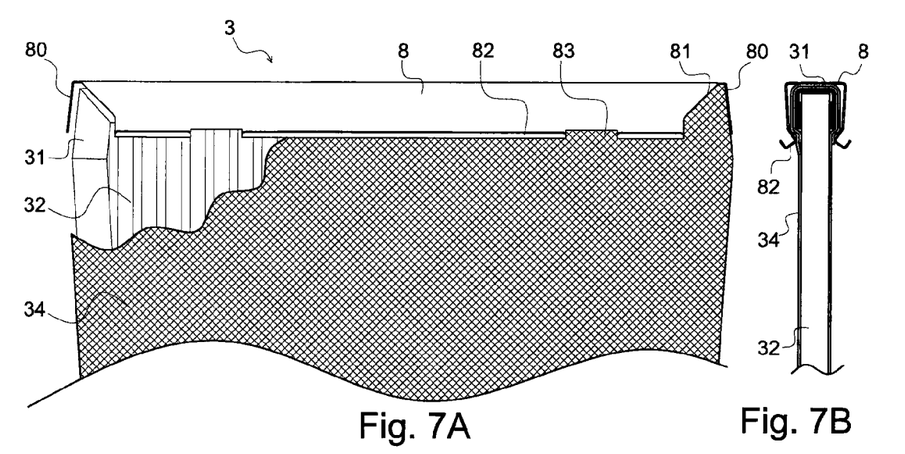
FIGS. 7A and 7B laterally and sectionally show the cloth clip which holds the filtering cloth on the sector, and with a thinner line a partial view of the sector without its cloth so as to illustrate the role of the cut provided in the cloth clip.
Figure 8A:
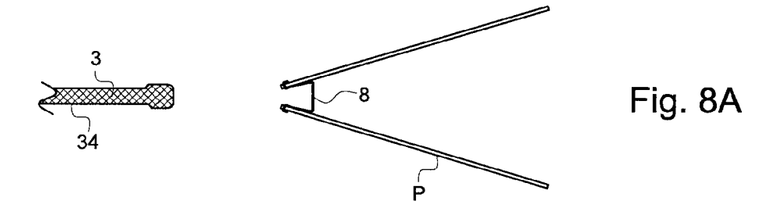
FIGS. 8A, 8B and 8C show a method for assembling the cloth clip with a tool P adapted to the opening thereof prior to the clamping onto the cloth.
Figure 8B:
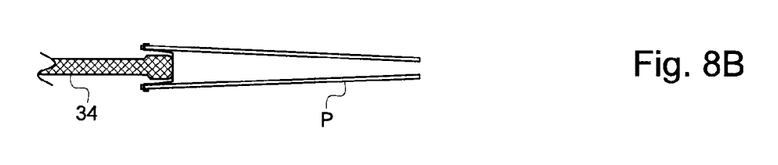
Figure 8C:
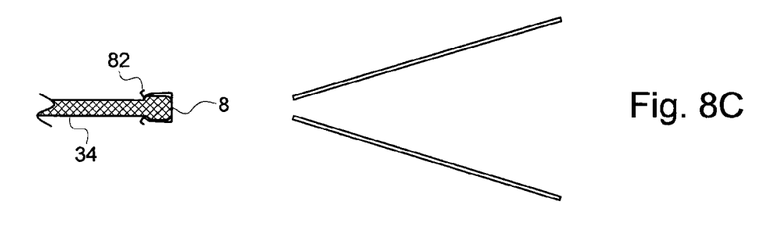

The sectors 3 are introduced into and accommodated in a triangular pocket 34 made from a filtering cloth opened at the base of the triangle. This pocket is further closed by folding the cloth on either side of the external edge of the sector and by wedging the cloth using a cloth clip 8 in the corner using the structure 32 supporting the cloth and the U-shaped frame 31 of the sector 3 which covers same as shown in FIG. 7B. The cloth clip 8 is made with a U-shaped section the sides of which form a jaw 82, such jaw extends almost up to the frame 31 of the sector so that it will be folded on the structure only, as shown in FIGS. 7A and 7B.

The filtering sectors 3 are connected at the radial ends thereof, also called outlet pipes 30, to offtakes 40 provided as protrusions on the external wall of a rotating central shaft 4 as shown in FIG. 2. Such offtakes 40 communicate with internal outlet channels 41 provided longitudinally in the internal volume of the shaft. As shown more particularly in FIGS. 2 and 4A to 4C, the radially internal end 30 of the sectors 3 slidingly engages into an elastic sleeve 45 fixed on the offtakes 40, whereas the tip 33 is engaged in said offtake.

Rings made in two parts, one of which 43a is integral with the shaft 4 and the other one 43b is detachable are coaxial with said shaft and located at a distance from the offtakes 40. The fixed part 43a is made integral with the shaft through an annular plate parallel to the plane of the sectors. Each one of parts 43a, 43b includes hemi-cylindrical notches 44. When both parts are united, the notches are closed so as to surround and hold the pipes 30 like clamps. The parts 43a, 43b of the ring thus include as many notches 44 as there are offtakes on the shaft 4. The brackets provided in the ring by placing the notches 44 opposite each other have their axes perfectly radially positioned on the offtakes 40.

Figure 3A:
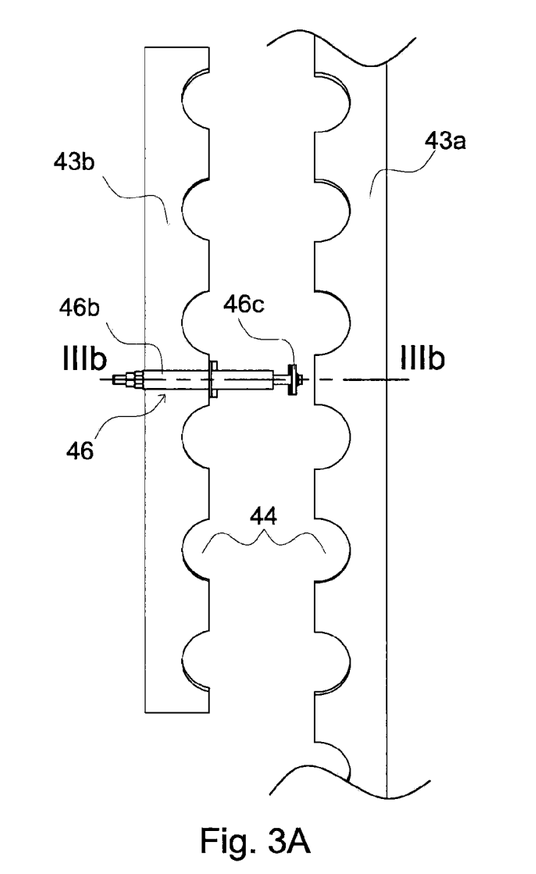
FIG. 3A is a top view of the ring integral with the shaft and the detachable ring assemblies with their clamps being shown separately.
Figure 3B:
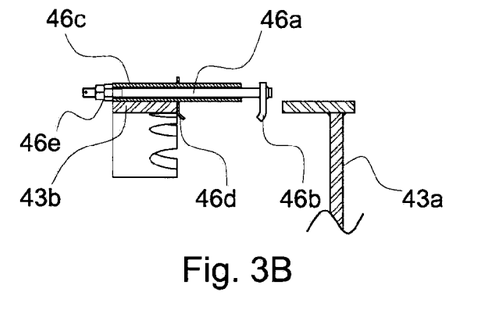
FIG. 3B is a section along IIIb-IIIb in FIG. 3A.
Figure 3C:
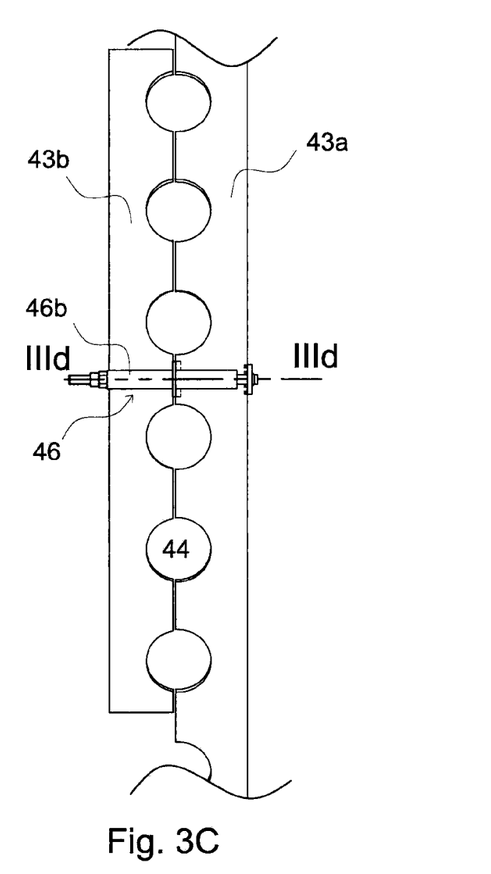
FIG. 3C is a top view of the ring integral with the shaft and the detachable ring elements with their clamps being shown coupled as they are after the installation of the sectors which are not shown on said figure.
Figure 3D:
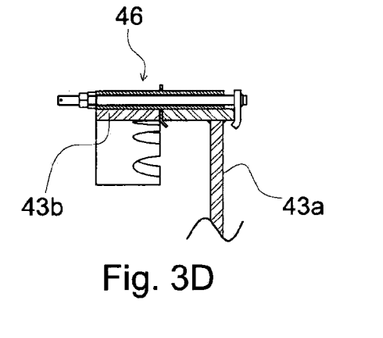
FIG. 3D is a section along IIId-IIId in FIG. 3C.
Figure 4A:
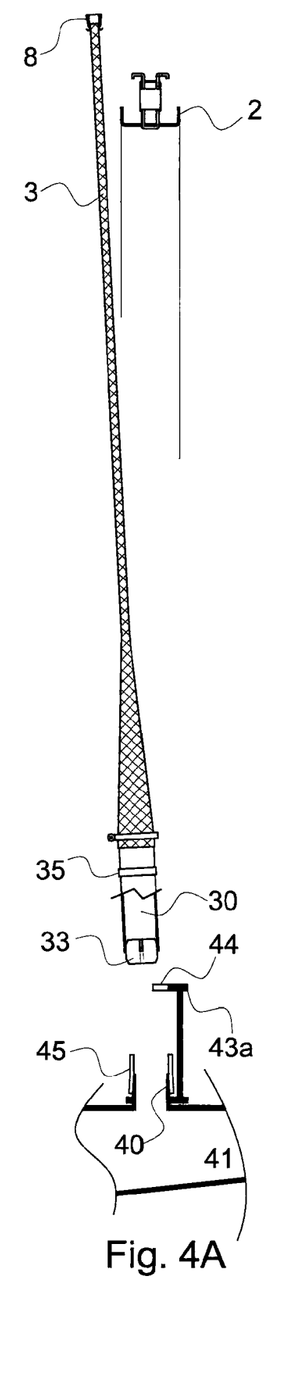
FIGS. 4A, 4B and 4C show respective side views of the first three phases of the method of the invention related to the assembling of the sector of the disc.

The detachable part 43b of the ring is preferably provided in several separable elements each being provided with a clamp 46, as shown more particularly in FIGS. 3A and 3B. Each element of the detachable part is removed to enable the passage of the corresponding sectors 3, during the mounting, and then mounted again to lock such sectors using the clamp 46. The clamp 46 is made of a rod 46a which is threaded up to one end provided with a staple 46b at the other end. The rod 46a is engaged into a transverse tube 46c having a square section and integral with each of the elements of the detachable part 43b of the ring. A square-hole washer 46d folded to form a staple opposite that of the rod is placed on the transverse tube 46c. The rod 46a cooperates with the check-nuts 46e to make both parts 43e and 43b integral with each other by tightening a staple as shown in FIGS. 3C, 3D, and 4C.

Figures 6A, 6B, 6C:
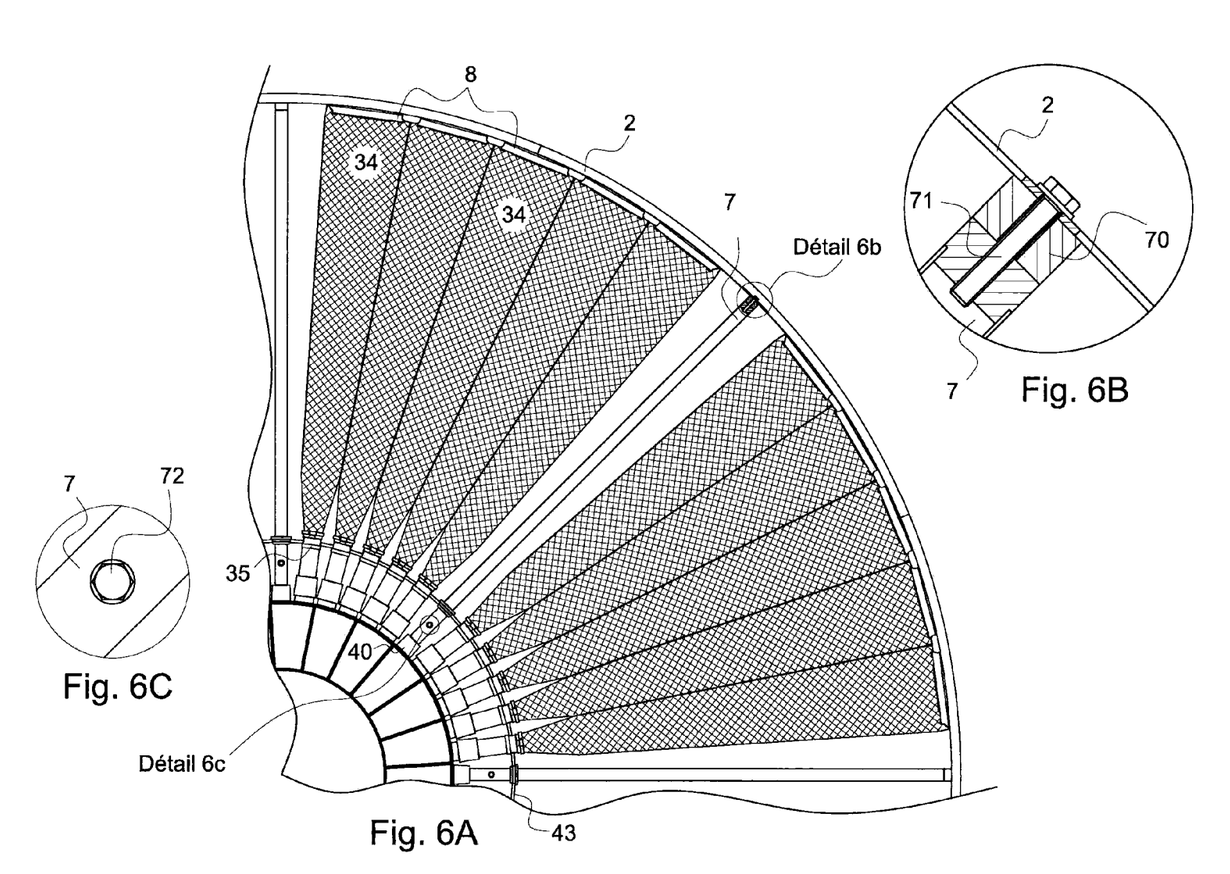
FIG. 6A shows a view of a disc in the assembling phase prior to the removal of the provisional spokes and prior to the assembling of the last sectors which must replace the spokes.
FIGS. 6B and 6C show detailed views of the system for fixing the spokes.

The assembling method of the invention is implemented as follows: A series of spokes 7 is mounted, which is intended to provide the temporary support of the rim 2 by inserting the same into the offtakes 40 and fixing same into the ring using screws 72, as shown in FIGS. 6A, 6B and 6C. In the assembling method shown in FIGS. 6A, 6B and 6C several spokes 7, for example eight, are positioned around the shaft 4 at equidistant angular positions. The rim 2 is fixed on the ends of the spokes 7 with screws 71. Spacers 70 are eventually positioned between the spokes and the sections of the rim to facilitate the dismounting of the spokes after the assembling of the rim. Then filtering sectors 3 are then positioned one by one on the free offtakes, first between the adjacent spokes 7 inside the rim 2 then as a replacement of the spokes until the complete filling of the disc 1.

The operation of fixing the rim 2 on the spokes 7 is carried out by simultaneously assembling several segments of curvilinear sections, for example eight, positioned end to end. Such sections have the shape of a U, the branches of which are oriented towards the outside of the disc 1. The installation of the sectors 3 is carried out as shown in FIG. 4A by bringing them parallel to the disc 1 plane.

Figure 4B:
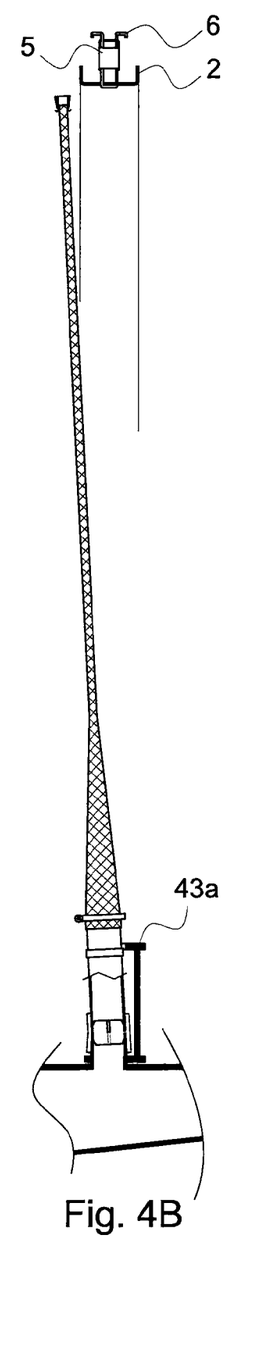
Figure 4C:
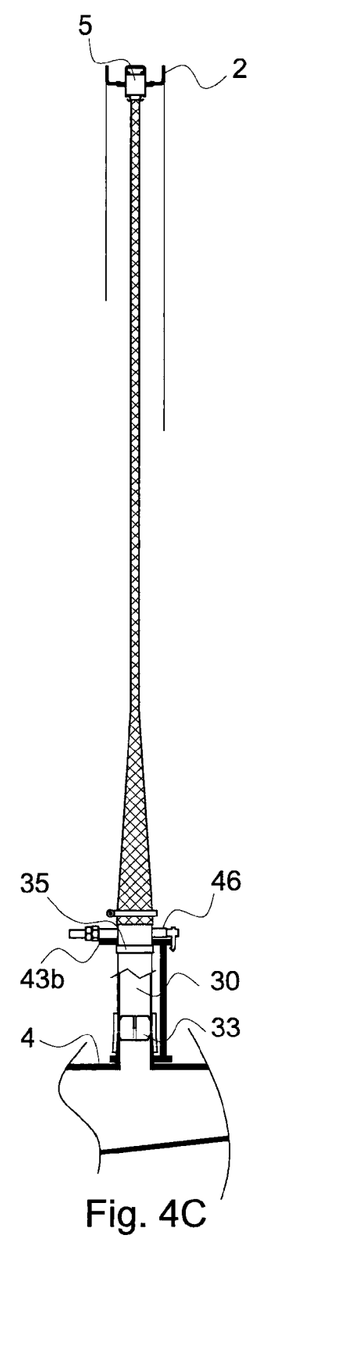
Figure 5A:
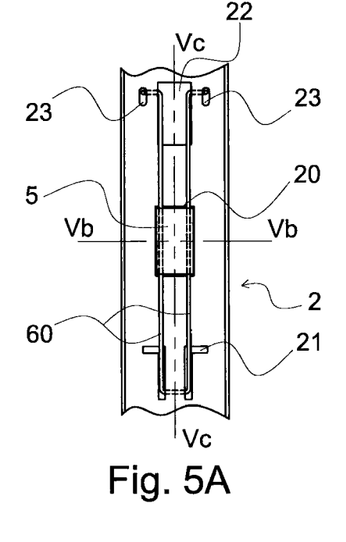
FIGS. 5A, 5B, 5C and 5D show partial, respectively side and sectional views, along Vb-Vb, Vc-Vc, Vd-Vd of the means for locking the sectors on the rim.
Figure 5B:
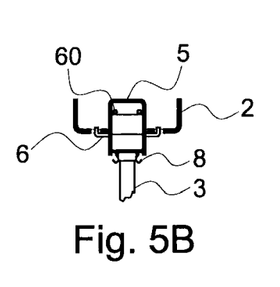
Figure 5C:
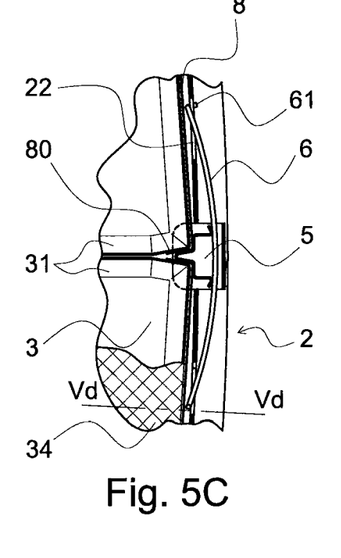
Figure 5D:
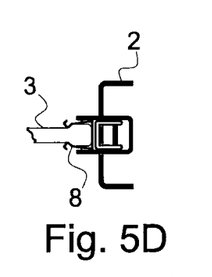
Figure 5E:
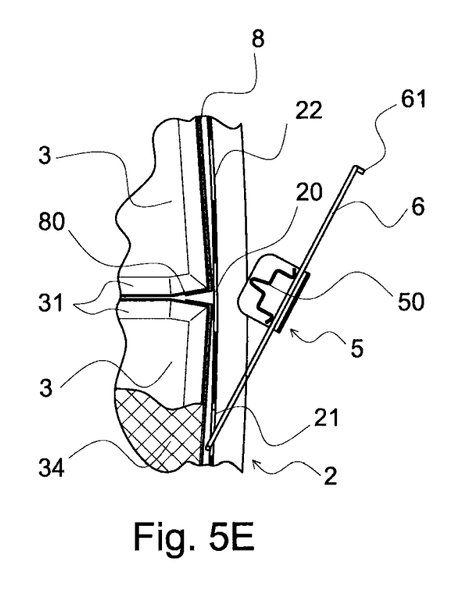
FIG. 5E also shows the locking means with the connection flange being separated prior to the locking operation, with the flange being shown in section for clarity.

Then the embedding tips 33 are introduced into the offtakes 40 previously provided with a sleeve 45 as shown in FIG. 4B. This introduction is carried out with a slight inclination of a few degrees only with respect to the disc plane because of the presence of the rim 2. After the connection, the sector inside the rim 2 is folded while engaging the pipe 30 into the notch 44 of the fixed part 43a of the ring 43, the holding ring 35 then being under said ring.

Then the sectors 3 are locked as shown in FIG. 4C, by fixing the outside edge thereof to the rim 2 using detachable connection flanges 5 shown in details in FIGS. 5A, 5B, 5C, 5D and 5E and the use of which is described hereinunder. Then the detachable part 43b of the ring is added and assembled to the fixed part 43a using clamps 46.

The rim 2 is provided with holes 20 intended to receive, each, a detachable connection flange 5 as shown in FIGS. 5A, 5B, 5C, 5D and 5E. The connection flange 5 has dimensions which are slightly smaller than those of the hole 20 of the rim 2 so that it can slide to cap the cloth clips 8 by tightening the external edge of the adjacent sectors 3, and align said sectors and connect the same to the rim 2 this way. The flanges 5 carry a radial spacer 50 which is intended to be chocked between two adjacent sectors 3 to provide their wedging by insertion between the elastic lugs 80 of the cloth clip 8.

The connection flange 5 is held in position using a spring effect quick-coupling 6 which provides a positional locking by avoiding any mechanical deformation that the locking with a nut, for example, could cause. The flanges 5 are provided in the shape of parts shown in FIGS. 5A, 5B, 5C, 5D and 5E the internal width of which is slightly greater than that of the cloth clips 8 which are provided on the external edge of the sectors. The spacer 50 which is located at the centre of the part has a V-shaped profile which spaces the elastic lugs 80 from the cloth clips 8 surrounding the external edge of the sectors 3 under the compression action exerted by the quick spring coupling 6.

The quick couplings 6 according to FIGS. 5A, 5B, 5C, 5D and 5E include two hair-pin shaped rods 60 having two free ends and a closed loop shaped opposite end. Such attachments are provided using a spring wire with a section selected as a function of the stress to be exerted. The rods 60 rest on the spacer 50 of the flange 5 whereas the loop-shaped end is engaged into a slot 21 of the rim 2 and the free ends bearing hooks 61 are introduced into and locked in openings 22 and 23 respectively provided through the rim 2. Both rods 60 are first introduced into the flange 5 and tightened to let the hooks 61 go therethrough. A flange 5 is connected to the attachment 6 after the elastic deployment of the rods and cannot inadvertently escape therefrom as is shown more particularly in FIG. 5E.

As soon as two adjacent sectors are folded in the rim 2, the flange 5 is introduced through the hole 20 to cap these and hold these in the disc plane. The ends of both rods bearing the hooks 61 are then taken through the opening 22 and forcibly engaged into the openings 23 to provide a perfect locking. Both rods forcibly rest on the spacer 50 of the flange 5 which is pushed under a constraint between the elastic lugs 80 of the cloth clip 8, like a wedge. When and as the sectors 3 are installed and connected to the rim 2 they are locked at the base thereof with the elements of the detachable part 43b of the ring using the clamps 46. Then an elastic and moderate wedging of the sectors 3 is provided without causing an excessive stress.

Similarly, the resistance supported by the rim 2 during the rotation thereof in the tank filled with the suspension to be filtered, which may be very thick, is thus appropriately distributed on all the sectors 3. To replace one or several sectors 3 or even the whole of these, the corresponding element or elements is/are taken from the half-ring 43b, the connection clamps 5 which connect the sectors to the rim 2 are released and then they are disengaged one by one by slightly inclining and taking them out of the offtakes 40 and the sleeves 45. The new sectors will be reinstalled when and as the other ones are taken out not to free a space of more than three or four sectors, for example, so that the rim 2 remains sufficiently supported during the operation.

The invention claimed is:

1. A filtration device comprising a disc provided with a rim formed by an assembly of a plurality of curvilinear section elements placed end to end, each curvilinear section element which acts to cap and rigidify at least three filtering sectors connected to offtakes provided in an external wall of a rotating central shaft housing internal outlet channels, each filtering sector is composed of a frame, a draining structure and one outlet pipe, the rim including holes each being intended to receive a detachable connection flange bearing on the one hand a radial spacer stuck between two adjacent filtering sectors to provide the relative and cooperating wedging thereof and on the other hand with a quick spring coupling for stress locking the radial spacer between the filtering sectors.

2. A device according to claim 1, wherein the filtering sectors are housed in triangular pockets made of filtering cloth, the external edges of which are folded on either side of the filtering sector and fixed with cloth clips.

3. A device according to claim 2, wherein the cloth clips include side flanks which form jaws and are bordered at longitudinal ends by elastic lugs.

4. A device according to claim 2, wherein the filtering sectors include a structure mounted inside a frame which acts to support the filtering cloth.

5. A device according to claim 4, wherein the jaws of the cloth clips rest on the structure only and do not extend up to the frame.

6. A device according to claim 1, wherein the rim includes a U-shaped section, the branches of which are oriented outwards and the width of which is greater than the thickness of the filtering sectors.

7. A device according to claim 1, further comprising a clamp including a fixed part integral with the rotating central shaft and a detachable part which, after assembling, define, at a distance from the offtakes, brackets intended to support the ends of the filtering sectors.

8. A device according to claim 7, wherein the detachable part of the clamp is divided into a plurality of independent elements, each including a clamp which provides the final locking of the filtering sectors after the assembling.

9. A device according to claim 1, wherein the rim includes eight curvilinear section elements.

10. A device according to claim 1, wherein the detachable connection flange has dimensions enabling it to slide into the hole of the rim to cap an exterior edge of two adjacent filtering sectors so as to adjust the filtering sectors with respect to each other within a plane of the disc and to connect the same to the rim.

11. A device according to claim 1, wherein the quick spring coupling includes two hairpin-like rods resting on the radial spacer of the detachable connection flange and a looped end of which is engaged into a slot of the rim, whereas opposing free ends thereof, bearing hooks, are introduced into and locked in openings provided in the rim.

12. A method for assembling and maintaining a disc filtration device, the method comprising:
providing a rim for capping and rigidifying at least three filtering sectors forming a disc, wherein each filtering sector is composed of a frame and a draining structure, the respective lower ends of the filtering sectors are provided with a pipe and a tip and are connected to offtakes provided in an external wall of a rotating central shaft having internal outlet channels and bearing a supporting ring supporting the respective lower ends;
making the supporting ring of two parts, one of which is fixed and integral with the rotating central shaft whereas the other one is detachable;
assembling of the filtering sectors is carried out on the offtakes of the rotating central shaft and on the fixed part of the supporting ring and further stabilized by a series of spokes providing the support of the rim;
affixing the rim on ends of the spokes; and
successively putting the filtering sectors in place of the spokes up to the complete filling of the disc so that no spokes remain.

13. A method according to claim 12, the rim is fixed on the spokes by simultaneously assembling curvilinear elements placed end to end.

14. A method according to claim 12, wherein a peripheral holding ring is intended to cooperate with notches provided on the fixed and detachable parts of the supporting ring, wherein the peripheral holding ring is fixed on the pipes.

15. A method according to claim 12, further comprising positioning the filtering sectors by bringing them parallel to a plane of the disc, then introducing the tips thereof into the offtakes with an inclination with respect to the plane of the disc, while folding the filtering sectors inside the rim and engaging the pipes into the supporting ring, the filtering sectors are locked on the rim through connection flanges and quick spring couplings and the detachable part being mounted on the fixed part of the supporting ring.

16. A method according to claim 12, further comprising, for maintenance, disengaging the detachable part of the supporting ring, releasing connection flanges corresponding to the filtering sectors to be replaced, and then removing the filtering sectors one by one by slightly inclining the filtering sectors and taking the tips out of the offtakes while simultaneously installing new filtering sectors so that the rim remains permanently supported.

* * * * *